United States Patent
Wang et al.

(10) Patent No.: US 6,677,263 B2
(45) Date of Patent: Jan. 13, 2004

(54) CATALYTIC PROMOTERS FOR THE CATALYTIC CRACKING OF HYDROCARBONS AND THE PREPARATION THEREOF

(75) Inventors: Longyan Wang, Henan (CN); Xiaobo Wei, Henan (CN); Danhe Liu, Henan (CN); Daijun Hao, Henan (CN); Jinlong Liu, Henan (CN); Xuhui Gong, Henan (CN)

(73) Assignees: China Petro Chemical Corporation, Beijing (CN); Luoyang Petro-Chemical Engineering Corporation SINOPEC, Henan (CN)

( * ) Notice: Subject to any disclaimer, the term of this patent is extended or adjusted under 35 U.S.C. 154(b) by 85 days.

(21) Appl. No.: 09/925,381

(22) Filed: Aug. 10, 2001

(65) Prior Publication Data

US 2002/0061813 A1 May 23, 2002

(30) Foreign Application Priority Data

Aug. 10, 2000 (CN) .......................................... 00124216 A

(51) Int. Cl.[7] .......................... B01J 29/00; B01J 23/02; B01J 23/06
(52) U.S. Cl. .......................... 502/73; 502/77; 502/341; 502/342; 502/343
(58) Field of Search .............................. 502/63, 64, 65, 502/71, 66, 73, 74, 77, 232, 302, 304, 340, 341, 342, 343, 355

(56) References Cited

U.S. PATENT DOCUMENTS

| 3,855,115 A | * | 12/1974 | Morrison ..................... 208/135 |
| 4,128,504 A | * | 12/1978 | Plank et al. ................... 502/60 |
| 4,350,835 A | * | 9/1982 | Chester et al. ............... 585/415 |
| 4,374,294 A | * | 2/1983 | Chu ............................ 585/466 |
| 4,458,023 A | * | 7/1984 | Welsh et al. ................... 502/65 |
| 4,485,185 A | * | 11/1984 | Onodera et al. ............... 502/71 |
| 4,490,569 A | * | 12/1984 | Chu et al. ..................... 585/415 |
| 4,554,393 A | * | 11/1985 | Liberts et al. ............... 585/322 |
| 4,612,298 A | * | 9/1986 | Hettinger et al. ............. 502/65 |
| 4,862,836 A | * | 9/1989 | Chen et al. ..................... 123/3 |
| 4,867,863 A | | 9/1989 | Herbst et al. |
| 4,929,337 A | | 5/1990 | Herbst et al. |
| 4,929,338 A | * | 5/1990 | Wormsbecher ......... 208/120.25 |
| 4,933,310 A | * | 6/1990 | Aufdembrink et al. ....... 502/71 |
| 4,968,650 A | * | 11/1990 | Chu et al. ..................... 502/61 |
| 4,975,402 A | | 12/1990 | LeVanMao et al. |
| 5,520,895 A | * | 5/1996 | Sharma et al. ........... 423/239.2 |
| 5,879,645 A | * | 3/1999 | Park et al. ............... 423/213.2 |
| 5,961,818 A | | 10/1999 | Pradhan et al. |
| 6,123,834 A | * | 9/2000 | Kao et al. ................... 208/135 |
| 6,180,557 B1 | * | 1/2001 | Choudhary et al. ......... 502/224 |
| 6,245,219 B1 | * | 6/2001 | Kao ........................... 208/137 |

FOREIGN PATENT DOCUMENTS

| CN | 1057408 A | 1/1992 |
| CN | 1072201 A | 5/1993 |
| GB | 2345293 A | 7/2000 |
| WO | 91/17827 | 11/1991 |
| WO | 98/51409 | 11/1998 |

* cited by examiner

Primary Examiner—Tom Dunn
Assistant Examiner—Colleen P. Cooke
(74) Attorney, Agent, or Firm—Birch, Stewart, Kolasch & Birch, LLP

(57) ABSTRACT

Disclosed is a catalytic promoter for fluid catalytic cracking of hydrocarbons, comprising a HZSM-5 zeolite in an amount of 5–65 wt % based on the total weight of the catalytic promoter, said zeolite being modified with Zn and at least one element selected from the group consisting of P, Ga, Al, Ni and rare earth elements, the combined amount of said modifying elements being 0.01–10.37 wt % based on total weight of said modified HZSM-5 zeolite. A reduced olefin content in gasoline from catalytic cracking process, an increased gasoline octane number and an increased lower olefin yield can be obtained using said catalytic promoter.

20 Claims, No Drawings

CATALYTIC PROMOTERS FOR THE CATALYTIC CRACKING OF HYDROCARBONS AND THE PREPARATION THEREOF

FILED OF THE INVENTION

The present invention relates to a catalytic promoter used in the process of fluid catalytic cracking of hydrocarbons in petroleum refining field. More particularly, it relates to a catalytic promoter used in the process of fluid catalytic cracking of hydrocarbons to reduce olefin content in gasoline from catalytic cracking process, and to the preparation thereof.

BACKGROUND OF THE RELATED ART

Gasoline octane number is one of the most important indexes to evaluate motor gasoline. The operating conditions comprising short contact time at an elevated temperature in the presence of an ultrastable zeolite catalyst are now generally employed in a unit for catalytic cracking in a refinery in order to increase gasoline octane number. Such a technique, however, results in increased olefins in gasoline from catalytic cracking process. Olefins in gasoline constitute the major reason for the high amount of contaminants from automobile exhaust emissions. It is necessary to reduce the olefin content in gasoline to meet environmental requirements. Thus, there's a great need to reduce olefin content in catalytically cracked products—gasoline, and meanwhile to increase or maintain gasoline octane number.

The use of catalytic cracking catalysts containing high silica zeolite, ZSM-5, to increase gasoline octane number, is well known to one skilled in the art. As disclosed in the art, a ZSM-5 zeolite can be incorporated into a catalytic cracking catalyst as one of the active components. Alternatively, the ZSM-5 zeolite as a single active component can be made into an additive catalyst which is then added to a unit for catalytic cracking in combination with a conventional catalytic cracking catalyst. The amount of the ZSM-5 zeolite added can vary widely; it can be either as little as 0.01–1 wt % or as much as 5–10 wt % or even more, based on the total weight of the catalyst. As disclosed in U.S. Pat. No. 4,929,337, a ZSM-5 zeolite modified with Ga is used as an active component for aromatization. Alkanes and olefins are subjected to cracking/aromatization by means of the shape selective cracking/aromatization component. The shape selective aromatization component converts alkanes and olefins to aromatic hydrocarbons. These catalysts, however, are mainly used in catalytic cracking to increase gasoline octane number, without an effect of reducing olefin content in gasoline. A process of catalytic cracking of heavy oils to increase gasoline octane number is disclosed in U.S. Pat. No. 4,867,863. A catalyst containing 0.5–5% HZSM-5 zeolite was used in the patent, with the result of an increased gasoline octane number. But the effect of reducing olefin content in gasoline was not indicated.

SUMMARY OF THE INVENTION

It is an object of the present invention to provide a catalytic promoter, which can not only reduce olefin content in gasoline but also increase gasoline octane number, at the same time, increase the yield of very useful industrial feedstock, lower olefins. It is another object of the present invention to provide a method for preparing said catalytic promoter.

DETAILED DESCRIPTION

The present catalytic promoter for the catalytic cracking of hydrocarbons comprises a HZSM-5 zeolite in an amount of 5–65%, and preferably 20–50% based on weight of the catalytic promoter. The HZSM-5 zeolite is modified with zinc and at least one element selected from a group consisting of P, Ga, Al, Ni and rare earth elements or their mixtures. The amount of the modifying elements in HZSM-5 can be adjusted depending on the catalytic cracking feedstock, the main catalytic cracking catalyst and the desired catalytic cracking effect, it being preferably 0.01–10.37 wt %, and more preferably 0.1–5.0 wt %. The applicant also discovered that the most desirable results are achieved by utilizing the present catalytic promoter containing 23%–95.3% by weight of zinc based on the total weight of the modifying elements.

The HZSM-5 zeolite used in this invention can be any of the commercially available products. The HZSM-5 zeolite with a $SiO_2/Al_2O_3$ ratio of preferably 20–500, more preferably 30–200, and most preferably 30–100, is highly preferred.

ZSM type series zeolites whose representative is HZSM-5 are such a kind of zeolite that have high silica content and structure of three-dimensional crossed straight channel. They are characterized by lipophilicity, hydrophobicity and good thermostability etc. The majority of their pores are about 5.5 Å in size. The catalytic activity of ZSM type relies on the surface acidity resulting from acid sites therein. Most of acid sites are located in the cavities of zeolites. ZSM type zeolites exhibit specific shape-selective catalyzing as a result of the particular pore path structure in conjunction with acid sites. Different acid-catalyzed reactions require different strength of acidic sites. The strength of acidic sites has a direct effect on the selectivity of a reaction. It is necessary to suitably adjust the amount, strength and distribution of acidic sites in the zeolites in order to induce a desirable reaction. For such a purpose, to modify zeolites is one of the most effective methods. In present invention some elements are incorporated into zeolites to effect such modification.

There are a wide variety of methods for incorporating some elements into zeolites, such as ion-exchange, impregnation and high temperature processing as disclosed in CN1,057,408A. The location where the incorporated element is in the zeolite, varies with the method employed, and has an influence on the properties of the zeolite. A modified zeolite is prepared by the impregnation method in present invention. The method of impregnation is simple and readily carried out. The impregnated zeolite or catalyst is dried and calcined, and then the modifying element is deposited on the zeolite and bound thereto, acting to adjust the acidity of the zeolite. The typical method for a zeolite modification in present invention comprises impregnating a HZSM-5 zeolite with an aqueous solution containing a compound of a modifying element and then drying and calcining the impregnated zeolite. Said compound can be any of water soluble compounds such as halide and inorganic or organic acid salts of the modifying element, as long as the modifying element therein can deposit on the zeolite and bind thereto during impregnation. Chloride, nitrate and sulfate salts are preferred. The zeolite can be impregnated with different solutions containing compounds of different modifying elements simultaneously or separately. The concentration of the modifying element in an aqueous solution is determined by the content of modifying elements required in said zeolite. The zeolite is normally impregnated with the above aqueous solution at 10–60° C. for 1–30 hours. The impregnated zeolite is usually dried at 100–160° C. for 1–8 hours and then calcined at an elevated temperature of 500–600° C. for 1–8 hours prior to pulverization. Fine powders of particle size greater than 150 mesh American Standard Screen are collected.

When modification of said zeolite is completed as described above, the present catalytic promoter is subject to a forming process to produce the product of final use. An effective amount of supports and binders also need to be added during forming. Preferably a support in an amount of 15–60% and a binder in an amount of 10–40% based on the total weight of the formed catalytic promoter product are added. It is preferred to use at least one material selected from $ZrO_2$, $P_2O_5$, clay, diatomaceous earth or sepiolite or mixtures thereof as the support. At least one material selected from alumina sol, silica-alumina sol, aluminum phosphate sol or mixtures thereof is preferably used as the binder.

The catalytic promoters are formed as follows. Said modified HZSM-5 zeolite is added into an effective amount of binders together with an effective amount of the support to produce a mixture. The obtained mixture is then subject to a slurrying and homogenizing step, while the pH is controlled at 2.5–4.8. The homogenized mixture is sprayed drying, washed with water, and then dried for about 4 hours to obtain the catalytic promoter products.

The binder used can be the commercially available product. There are various methods for preparing said binder. For example, the alumina sol binder can be obtained by dissolving the aluminum metal in hydrochloric acid aqueous solution or by dissolving the pseudoboehmite in nitric acid or hydrochloric acid aqueous solution while heating. The alumina is present, in the sol of pH 2.0–3.5, in the range of 10–30wt %. See Examples 12–14 in CN1072201A for the preparation of silica-alumina sol binder. To be specific, 567 g of 25% sulfuric acid solution is added to 120 g of purified water. Then 0.19 L of aluminum sulfate aqueous solution containing 90 g/L $Al_2O_3$ is added. The mixture is stirred well and cooled to below 10° C. 2.36 L of water glass containing 124 g/l $SiO_2$ (modulus 3.2–3.3) is added while stirring to obtain the silica-alumina sol. Aluminum phosphate sol can be made by neutralization method. Namely, an appropriate amount of water is added to 85% phosphoric acid. The solution is heated to about 110° C. Aluminum hydroxide solid powder (96% purity) is added slowly. The temperature is maintained above 100° C. for one hour. The pH is adjusted to be about 1.4 to obtain the aluminum phosphate sol, which contains about 35% $P_2O_5$ and about 8.5% $Al_2O_3$.

The present catalytic promoters for the catalytic cracking of hydrocarbons are suitable to process of fluid catalytic cracking of hydrocarbons, in particular to the catalytic cracking of vacuum gas oils (VGO), atmospheric resid or VGO blended with vacuum resid. The present catalytic promoters can be employed in combination of various conventional catalysts for the fluid catalytic cracking of hydrocarbons. The amount of the present catalytic promoters added can vary with the feedstock to be catalytically cracked, the main catalyst used and the desired catalytic cracking effect, generally it being 1–15% based on the catalyst inventory in unit, i.e. the combined weight of main catalyst and the catalytic promoters charged into the catalytic cracking unit. The present catalytic promoter product is used in the form of finely-divided powders, the bulk density of which being less than 1.0 g/ml and the particle size distribution being as follows, thus producing a catalyst maintaining the fluid state during the reaction and regeneration process:

0–40 μm, not more than 20 wt %
40–80 μm, not less than 55 wt %
>80 μm, not more than 25 wt %

The present catalytic promoter can be blended with the main catalyst for catalytic cracking and then added to the reaction system through a feeding system connecting a catalyst storage tank. Alternatively, the present catalytic promoter can be added to the reaction system separately through a small catalyst feeding system.

The addition of a small amount of the present catalytic promoter to a catalytic cracking unit under conventional catalytic cracking conditions can promote the cracking, hydrogen transfer and aromatization of olefins in gasoline fraction as well as isomerization of hydrocarbons. Thus the advantages of the present invention compared with prior art lie in a reduced olefin content in gasoline from catalytic cracking, an increased gasoline octane number and an increase in the yield of lower olefins.

The present catalytic promoter meets the use requirement of a conventional catalytic cracking process. Heavy oils could be employed as feedstock to produce high-quality gasoline and diesel oil together with a significant amount of liquefied petroleum gas under conventional catalytic cracking conditions. For example, said reaction is carried out at 480–540° C., preferably at 490–535° C., and more preferably at 500–530° C., for 0.5–20 seconds, preferably 0.75–15 seconds, and more preferably 1–7 seconds. Therefore, both reduced olefin content in gasoline and an increased gasoline octane number can be obtained from heavy oils such as atmospheric resid, vacuum resid or mixtures thereof. Accordingly, the quality of gasoline is improved, together with an increase in the yield of liquefied petroleum gas.

The advantages of the present invention will become more apparent with reference to following examples, but these examples are not construed with limiting the present invention. The protection scope of the present invention is defined by the appended claims.

All percentages or ratios used are by weight unless otherwise stated.

Examples 1–16 illustrate the preparation of the modified zeolite in this invention. Examples 17–22 illustrate the preparation of formed catalytic promoter product in this invention. The performance experiments of the present catalytic promoter products are illustrated in Example 23.

EXAMPLE 1

1500 g of HZSM-5 zeolite with a silica/alumina ratio of 60 under NKF series commercially available from The Catalyst Factory of Nankai University in Tianjin (the HZSM-5 zeolites used in the following Examples 2–16 are from such source), is impregnated with 4000 ml of 0.15M $Zn(NO_3)_2$ aqueous solution and 666 ml of 0.6M $Ga(NO_3)_2$ aqueous solution separately. To complete each impregnation, the mixture is slurried by rapidly stirring at 40° C. for 2 hours. The resulting slurry is filtered after each impregnation. The resulting filter cake is dried at 110° C. for 2 hours, then calcined at 550° C. for 3 hours prior to pulverization. The finely-divided powders greater than 150 mesh American Standard Screen are collected, which are referred to briefly as modified zeolite A, namely AMZSM-5, containing 2.6% Zn and 1.86% Ga.

EXAMPLE 2

This example is carried out as in Example 1, except that 4000 ml of a 0.1M $Zn(NO_3)_2$ aqueous solution and 2000 ml of a 0.6M $Ga(NO_3)_2$ aqueous solution are used instead. The product obtained is referred to briefly as modified zeolite B, namely BMZSM-5, containing 1.73% Zn and 5.6% Ga.

EXAMPLE 3

This example is carried out as in Example 1, except that 4000 ml of a 0.55M $Zn(NO_3)_2$ aqueous solution, 300 ml of a 0.6M $Ga(NO_3)_2$ aqueous solution and a zeolite with a silica/alumina ratio of 35 are used instead. The product obtained is referred to briefly as modified zeolite C, namely CMZSM-5, containing 9.53% Zn and 0.84% Ga.

EXAMPLE 4

This example is carried out as in Example 1, except that 4000 ml of a 0.01M $Zn(NO_3)_2$ aqueous solution, 50 ml of a 0.1M $Ga(NO_3)_2$ aqueous solution and a zeolite with a silica/alumina ratio of 50 are used instead. The product obtained is referred to briefly as modified zeolite D, namely DMZSM-5, containing 0.173% Zn and 0.02% Ga.

EXAMPLE 5

This example is carried out as in Example 1, except that 4000 ml of a 0.01M $Zn(NO_3)_2$ aqueous solution, 500 ml of a 0.01M $Ga(NO_3)_2$ aqueous solution and a zeolite with a silica/alumina ratio of 120 are used instead. The product obtained is referred to briefly as modified zeolite E, namely EMZSM-5, containing 0.173% Zn and 0.23% Ga.

EXAMPLE 6

This example is carried out as in Example 1, except that 1300 ml of a 0.6M mixed rare earth nitrate aqueous solution with a molar ratio of Ce/La/Nd=2:1:0.1 is used in place of the $Ga(NO_3)_2$ solution. The product obtained is referred to briefly as modified zeolite F, namely FMZSM-5, containing 2.6% Zn and 7.28% mixed rare earth.

EXAMPLE 7

This example is carried out as in Example 1, except that 4000 ml of a 0.1M $Zn(NO_3)_2$ aqueous solution and 1000 ml of a 0.6M mixed rare earth nitrate aqueous solution with a molar ratio of Ce/La/Nd=2:1:0.1 are used instead. The product obtained is referred to briefly as modified zeolite G, namely GMZSM-5, containing 1.73% Zn and 5.6% mixed rare earth.

EXAMPLE 8

This example is carried out as in Example 1, except that 4000 ml of a 0.55M $Zn(NO_3)_2$ aqueous solution, 500 ml of a 0.1M mixed rare earth nitrate aqueous solution with a molar ratio of Ce/La/Nd=2:1:0.1 and a zeolite with a silica/alumina ratio of 35 are used instead. The product obtained is referred to briefly as modified zeolite H, namely HMZSM-5, containing 9.53% Zn and 0.47% mixed rare earth.

EXAMPLE 9

This example is carried out as in Example 1, except that 4000 ml of a 0.1M $Zn(NO_3)_2$ aqueous solution, 50 ml of a 0.1M mixed rare earth nitrate aqueous solution with a molar ratio of Ce/La/Nd=2:1:0.1 and a zeolite with a silica/alumina ratio of 50 are used instead. The product obtained is referred to briefly as modified zeolite I, namely IMZSM-5, containing 0.173% Zn and 0.05% mixed rare earth.

EXAMPLE 10

This example is carried out as in Example 1, except that 4000 ml of a 0.01M $Zn(NO_3)_2$ aqueous solution, 200 ml of a 0.1M mixed rare earth nitrate aqueous solution with a molar ratio of Ce/La/Nd=2:1:0.1 and a zeolite with a silica/alumina ratio of 120 are used instead. The product obtained is referred to briefly as modified zeolite J, namely JMZSM-5, containing 0.173% Zn and 0.19% mixed rare earth.

EXAMPLE 11

This example is carried out as in Example 1, except that 1300 ml of a 0.6M $Ce_2(SO_4)_3$ aqueous solution is used in place of the $Ga(NO_3)_2$ aqueous solution. The product obtained is referred to briefly as modified zeolite K, namely KMZSM-5, containing 2.6% Zn and 7.2% Ce.

EXAMPLE 12

This example is carried out as in Example 1, except that 4000 ml of a 0.1M $Zn(NO_3)_2$ aqueous solution and 1000 ml of a 0.6M $Ce_2(SO_4)_3$ aqueous solution are used instead. The product obtained is referred to briefly as modified zeolite L, namely LMZSM-5, containing 1.73% Zn and 5.5% Ce.

EXAMPLE 13

This example is carried out as in Example 1, except that 4000 ml of a 0.55M $Zn(NO_3)_2$ aqueous solution and 500 ml of a 0.1M $Ce_2(SO_4)_3$ aqueous solution are used instead. The product obtained is referred to briefly as modified zeolite M, namely MMZSM-5, containing 9.53% Zn and 0.47% Ce.

EXAMPLE 14

This example is carried out as in Example 1, except that 4000 ml of a 0.01M $Zn(NO_3)_2$ aqueous solution, 50 ml of a 0.1M $Ce_2(SO_4)_3$ aqueous solution and a zeolite with a silica/alumina ratio of 50 are used instead. The product obtained is referred to briefly as modified zeolite N, namely NMZSM-5, containing 0.173% Zn and 0.05% Ce.

EXAMPLE 15

This example is carried out as in Example 1, except that 4000 ml of a 0.01M $Zn(NO_3)_2$ aqueous solution, 200 ml of a 0.1M $Ce_2(SO_4)_3$ aqueous solution and a zeolite with a silica/alumina ratio of 120 are used instead. The product obtained is referred to briefly as modified zeolite P, namely PMZSM-5, containing 0.173% Zn and 0.18% Ce.

EXAMPLE 16

This example is carried out as in Example 1, except that 4000 ml of a 0.1M $Zn(NO_3)_2$ aqueous solution and 1000 ml of a 0.6M $NiSO_4$ aqueous solution are used simultaneously. That is to say, the impregnation process with two solutions is in one step. The product obtained is referred to briefly as modified zeolite Q, namely QMZSM-5, containing 1.73% Zn and 5.5% Ni.

EXAMPLE 17

980 ml of alumina sol (pH 3.0, 21% $Al_2O_3$) is added to 1860 ml of clay slurry containing 25% clay to produce a mixture. The mixture is stirred for 30 minutes. Then 1200 g of CMZSM-5 zeolite is mixed with the mixture above. The resulting mixture is slurried and homogenized while the pH is controlled at 2.5–4.8. The homogenized product is sprayed drying, then washed with water, finally oven dried at 120° C. for 4 hours to obtain a catalytic promoter product, called a, containing 64.1% CMZSM-5 based on the weight of dried product.

EXAMPLE 18

1000 ml of distilled water and 90 ml of concentrated nitric acid are added into a 1500 ml round-bottom flask separately. The contents are stirred for 5 minutes. 200 g of pseudoboehmite is weighed and added to the flask gradually. The temperature is maintained at 80–95° C. while stirring 30 minutes. The slurry obtained is poured into a homogenizer. 860 ml of clay slurry containing 25% clay is added, followed by addition of 85 g of aluminum phosphate sol (pH 1, 35% $P_2O_5$). The mixture is stirred for 5 minutes. 380 g of PMZSM-5 zeolite is mixed with the above mixture. The resulting mixture is slurried and homogenized while the pH is controlled at 2.5–4.8. The homogenized product is sprayed drying, then washed with water, finally oven dried at 120° C. for 4 hours to obtain a catalytic promoter product, called b, containing 49.3% by weight of PMZSM-5 and 3.9% by weight of $P_2O_5$ based on the weight of the dried product.

EXAMPLE 19

980 ml of alumina sol (pH 3.0, 21% $Al_2O_3$) is added to 1860 ml of clay slurry containing 25% clay to produce a mixture. To the mixture was added 105 g of aluminum phosphate sol (pH1, 35% $P_2O_5$). The resulting mixture is stirred for 30 minutes. Then 463.1 g of IMZSM-5 zeolite is mixed in. The resulting mixture is slurried and homogenized while the pH is controlled at 2.5–4.8. The homogenized product is sprayed drying, then washed with water, finally oven dried at 120° C. for 4 hours to obtain a catalytic promoter product, called c, containing 39.6% IMZSM-5 and 3.1% $P_2O_5$ based on the weight of dried product.

EXAMPLE 20

1000 ml of distilled water and 90 ml of concentrated nitric acid are added into a 1500 ml round-bottom flask separately. The contents are stirred for 5 minutes. 200 g of pseudoboehmite is weighed and added to the flask gradually. The temperature is maintained at 80–95° C. while stirring 30 minutes. The slurry obtained is poured into a homogenizer. 1860 ml of clay slurry containing 25% clay is added, followed by addition of 105 g of aluminum phosphate sol (pH 1, 35% $P_2O_5$). The mixture is stirred for 5 minutes. 246 g of BMZSM-5 zeolite is mixed with the above mixture. The resulting mixture is slurried and homogenized while the pH is controlled at 2.5–4.8. The homogenized product is sprayed drying, then washed with water, finally oven dried at 120° C. for 4 hours to obtain a catalytic promoter product, called d, containing 27.5% BMZSM-5 and 4% $P_2O_5$ based on the weight of the dried product.

EXAMPLE 21

1000 ml of distilled water and 90 ml of concentrated nitric acid are added into a 1500 ml round-bottom flask separately. The contents are stirred for 5 minutes. 200 g of pseudoboehmite is weighed and added to the flask gradually. The temperature is maintained at 80–95° C. while stirring 30 minutes. The slurry obtained is poured into a homogenizer. 860 ml of clay slurry containing 25% clay is added, followed by addition of 85 g of aluminum phosphate sol (pH 1, 35% $P_2O_5$). The mixture is stirred for 5 minutes. 105 g of FMZSM-5 zeolite is mixed with the above mixture. The resulting mixture is slurried and homogenized while the pH is controlled at 2.5–4.8. The homogenized product is sprayed drying, then washed with water, finally oven dried at 120° C. for 4 hours to obtain a catalytic promoter product, called e, containing 21.2% FMZSM-5 and 6% $P_2O_5$ based on the weight of the dried product.

EXAMPLE 22

1000 ml of distilled water and 90 ml of concentrated nitric acid are added into a 1500 ml round-bottom flask separately. The contents are stirred for 5 minutes. 200 g of pseudoboehmite is weighed and added to the flask gradually. The temperature is maintained at 80–95° C. while stirring 30 minutes. The slurry obtained is poured into a homogenizer. 860 ml of clay slurry containing 25% clay is added, followed by addition of 58 g of aluminum phosphate sol (pH 1, 35% $P_2O_5$). The mixture is stirred for 5 minutes. 56 g of LMZSM-5 zeolite is mixed with the above mixture. The resulting mixture is slurried and homogenized while the pH is controlled at 2.5–4.8. The homogenized product is sprayed drying, then washed with water, finally oven dried at 120° C. for 4 hours to obtain a catalytic promoter product, called f, containing 12.8% LMZSM-5 and 4.6% $P_2O_5$ based on the weight of the dried product.

EXAMPLE 23

A series of catalytic promoters are prepared by varying the types and amounts of modified zeolites. The experiment is carried out in a pilot plant, with a good result of reduced olefin content in gasoline. The reaction conditions employed in the experiment in a small-scale riser are as follows:

| | |
|---|---|
| Feedstock oil | Vacuum gas oil from Shengli Oilfield + 15% vacuum resid |
| Catalyst | Ultrastable Y zeolite catalyst DVR-1 (manufactured by the Catalyst Factory of Qilu Petrochemical Corp.) |
| Residence time of reaction stream | 2.5–3.5 seconds |
| Catalyst activity | 61.1 |
| Catalyst/oil ratio | 6.5–6.7 |
| Reaction temp. | 510° C. |

In the following table, the "control" does not contain the present catalytic promoter, and "5% a"–"5% f" mean 5% of one of the a–f catalytic promoters prepared in the Examples above based on the catalyst inventory in the unit.

The results of a pilot plant experiment

| Catalytic promoter | Control | 5% HZSM-5 (Not modified) | 5% a | 5% b | 5% c | 5% d | 5% e | 5% f |
|---|---|---|---|---|---|---|---|---|
| The amount of modified HZSM-5 zeolite in the catalytic promoter | 0 | 27.1 | 64.1 | 49.3 | 39.6 | 27.5 | 21.2 | 12.8 |
| Yields, wt % | | | | | | | | |
| Cracked gas | 17.26 | 21.82 | 25.57 | 23.98 | 22.32 | 21.26 | 19.63 | 18.1 |
| Dry gas | 1.61 | 2.37 | 2.29 | 2.1 | 1.86 | 2.28 | 1.81 | 1.72 |

-continued

The results of a pilot plant experiment

| Catalytic promoter | | Control | 5% HZSM-5 (Not modified) | 5% a | 5% b | 5% c | 5% d | 5% e | 5% f |
|---|---|---|---|---|---|---|---|---|---|
| Liquefied petroleum gas | | 15.65 | 19.45 | 23.28 | 21.88 | 20.46 | 18.98 | 17.82 | 16.38 |
| | $C_3H_6$ | 6.08 | 8.12 | 9.47 | 9.01 | 8.8 | 8.7 | 7.4 | 7.39 |
| | $C_3H_8$ | 0.6 | 1.2 | 1.1 | 1.03 | 0.9 | 0.8 | 0.69 | 0.62 |
| | $C_4H_{10}$ | 1.97 | 3.78 | 4.17 | 3.87 | 3.41 | 2.37 | 2.1 | 1.73 |
| | $C_4H_8$ | 6.98 | 6.35 | 8.54 | 7.97 | 7.35 | 7.11 | 7.63 | 6.64 |
| Gasoline | | 35.01 | 33.5 | 33.06 | 33.13 | 33.41 | 33.79 | 34.66 | 34.81 |
| LCO(Light Cycle Oil) | | 22.2 | 21.5 | 17.59 | 19.22 | 19.87 | 20.03 | 20.22 | 21.52 |
| HCO(Heavy Cycle Oil) | | 20.11 | 18.1 | 17.65 | 18.08 | 18.47 | 19.05 | 19.87 | 19.98 |
| Coke | | 4.52 | 4.54 | 4.98 | 4.89 | 4.8 | 4.74 | 4.61 | 4.58 |
| Loss | | 0.9 | 1.15 | 1.15 | 0.7 | 1.13 | 1.13 | 1.01 | 1.01 |
| Total | | 100 | 100 | 100 | 100 | 100 | 100 | 100 | 100 |
| Conversion, % | | 57.69 | 60.4 | 64.76 | 62.7 | 61.66 | 60.92 | 59.91 | 58.5 |
| Light oil yield, % | | 57.21 | 55 | 50.65 | 52.35 | 53.28 | 53.82 | 54.88 | 56.33 |
| Gasoline composition, v % | | | | | | | | | |
| | Alkanes | 26.6 | 27.3 | 27.5 | 28.2 | 29.8 | 30.8 | 29.9 | 29.2 |
| | Olefin | 47.7 | 48.9 | 23.1 | 26.4 | 28.5 | 35.8 | 38.7 | 42.6 |
| | Aromatics | 25.7 | 23.8 | 49.4 | 45.4 | 41.7 | 33.4 | 31.4 | 28.2 |
| Gasoline octane number RON | | 89.4 | 89.8 | 94 | 93.6 | 91.8 | 91.3 | 91 | 89.5 |
| Reduction in olefin in gasoline (%) | | | −2.5 | 51.6 | 44.7 | 40.3 | 24.9 | 18.9 | 10.7 |
| Increase in RON of gasoline (%) | | | 0.45 | 5.1 | 4.7 | 2.7 | 2.1 | 1.8 | 0.1 |
| Increase in lower olefins (%) | | | 33.6 | 55.8 | 48.2 | 44.7 | 43.1 | 21.7 | 21.5 |

It can be seen from the results of comparative experiments that the olefin content in gasoline was decreased remarkably by 10.7–51.6% by the addition of 5%, based on the total loading weight of the catalyst charged into the unit, of the present a–f catalytic promoters to a conventional industrial catalyst for catalytic cracking of hydrocarbons. In addition, gasoline octane number (RON) and yield of propylene in liquefied petroleum gas were increased by 0.1–5.1% and 21.5–55.8% respectively. On the other hand, HZSM-5, which is not modified, couldn't reduce the olefin content in gasoline; instead, the olefin content therefrom was slightly increased.

It will be evident to those skilled in the art that the invention is not limited to the details of the foregoing illustrative examples and that the present invention may be embodied in other specific forms without departing from the essential attributes thereof, and all changes which come within the meaning and range of equivalency of the claims are therefore intended to be embraced therein.

We claim:

1. A catalytic promoter for the catalytic cracking of hydrocarbons, comprising a HZSM-5 zeolite in an amount of 5–65 wt % based on the total weight of the catalytic promoter, said zeolite being modified with Zn, P, and at least one rare earth element, the combined amount of said modifying elements being 0.01–10.37 wt % based on total weight of said modified HZSM-5 zeolite.

2. The catalytic promoter according to claim 1, wherein the modifying elements are present in the HZSM-5 zeolite in an amount of 0.1–5.0% based on the total weight of said modified HZSM-5 zeolite.

3. The catalytic promoter according to claim 1, wherein said catalytic promoter comprises said HZSM-5 zeolite in an amount of 20–50%.

4. The catalytic promoter according to claim 1, wherein the amount of zinc in said HZSM-5 zeolite is 23%–95.3% based on the total weight of said modifying elements.

5. The catalytic promoter according to claim 1, further comprising at least one support selected from the group consisting of $SiO_2$, $Al_2O_3$, $ZrO_2$, $P_2O_5$, clay, diatomaceous earth and sepiolite or mixtures thereof in an amount of 15–60 wt %; and at least one binder selected from the group consisting of alumina sol, alumina-silica sol and aluminum phosphate sol or mixtures thereof in an amount of 10–40 wt %, based on the total weight of said catalytic promoter.

6. The catalytic promoter according to claim 2, wherein the amount of zinc in said HZSM-5 zeolite is 23%–95.3% based on the total weight of said modifying elements.

7. The catalytic promoter according to claim 3, wherein the amount of zinc in said HZSM-5 zeolite is 23%–95.3% based on the total weight of said modifying elements.

8. The catalytic promoter according to claim 2, further comprising at least one support selected from the group consisting of $SiO_2$, $Al_2O_3$, $ZrO_2$, $P_2O_5$, clay, diatomaceous earth and sepiolite or mixtures thereof in an amount of 15–60 wt %; and at least one binder selected from the group consisting of alumina sol, alumina-silica sol and aluminum phosphate sol or mixtures thereof in an amount of 10–40 wt %, based on the total weight of said catalytic promoter.

9. The catalytic promoter according to claim 3, further comprising at least one support selected from the group, consisting of $SiO_2$, $Al_2O_3$, $ZrO_2$, $P_2O_5$, clay, diatomaceous earth and sepiolite or mixtures thereof in an amount of 15–60 wt %; and at least one binder selected from the group consisting of alumina sol, alumina-silica sol and aluminum phosphate sol or mixtures thereof in an amount of 10–40 wt %, based on the total weight of said catalytic promoter.

10. The catalytic promoter according to claim 5, wherein said support comprises $P_2O_5$.

11. The catalytic promoter according to claim 8, wherein said support comprises $P_2O_5$.

12. The catalytic promoter according to claim 9, wherein said support comprises $P_2O_5$.

13. The catalytic promoter according to claim 5, wherein said binder comprises aluminum phosphate sol, and said P is incorporated into said catalytic promoter via the addition of said aluminum phosphate sol.

14. The catalytic promoter according to claim 10, wherein said binder is aluminum phosphate sol, and said P element is incorporated into said catalytic promoter via the addition of said aluminum phosphate sol.

15. The catalytic promoter according to claim 11, wherein said binder comprises aluminum phosphate sol, and said P element is incorporated into said catalytic promoter via the addition of said aluminum phosphate sol.

16. The catalytic promoter according to claim 12, wherein said binder comprises aluminum phosphate sol, and said P element is incorporated into said catalytic promoter via the addition of said aluminum phosphate sol.

17. The catalytic promoter according to claim 13, wherein a pH of said aluminum phosphate sol is about 2.0–3.5.

18. The catalytic promoter according to claim 14, wherein a pH of said aluminum phosphate sol is about 2.0–3.5.

19. The catalytic promoter according to claim 15, wherein a pH value of said aluminum phosphate sol is about 2.0–3.5.

20. The catalytic promoter according to claim 16, wherein a pH value of said aluminum phosphate sol is about 2.0–3.5.

\* \* \* \* \*